A. BRANSHAW.
Car Coupling.

No. 89,913.

Patented May 11, 1869.

Witnesses:

Inventor:
Albert Branshaw

United States Patent Office.

ALBERT BRANSHAW, OF FOND DU LAC, WISCONSIN.

Letters Patent No. 89,913, dated May 11, 1869.

---

IMPROVED CAR-COUPLING.

---

The Schedule referred to in these Letters Patent and making part of the same.

---

*To all whom it may concern:*

Be it known that I, ALBERT BRANSHAW, of Fond du Lac, in the county of Fond du Lac, and State of Wisconsin, have invented a new and improved Railroad-Car Coupling; and I do hereby declare that the following is a full, clear, and exact description thereof, reference being had to the accompanying drawings, making part of this specification, in which—

Similar letters of reference indicate corresponding parts in the several figures.

This invention relates to a new and improved construction of railroad-car coupling, wherein a gravitating latch or hook is employed, in combination with a cam or lever, arranged beneath this hook, and adapted for locking it open or shut, as will be hereinafter described.

I am aware that locking-devices have hitherto been used, in combination with latches, for receiving and holding shackles or links, but I am not aware that a coupling for cars has ever been known or used in the following manner.

To enable others skilled in the art to understand my invention, I will describe its construction and operation.

In the accompanying drawings—

A represents a draw-bar, having formed upon its front end a bell-mouth coupling-box and bunter, b.

The bottoms of the bar and box are slotted longitudinally and centrally, so as to form a recess, a, extending forward and upward, and leaving a shoulder-abutment, g, at the rear end of the flaring mouth b.

This recess or slot a has fitted loosely in it a gravitating-hook or latch-bar, C, which is pivoted to the bar A by a bolt, e, passing transversely through the bar A and the latch-bar C, as shown.

Figure 1:
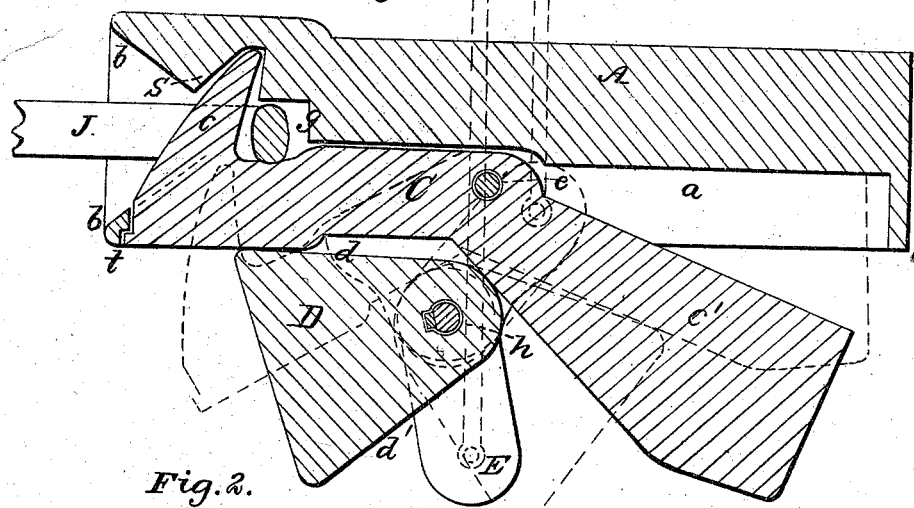
Figure 1 is a longitudinal section, taken through a coupling-box, and a portion of its draw-bar, in the vertical plane indicated by line x x, fig. 2, showing one end of a link confined in place in the box.
Figure 2:
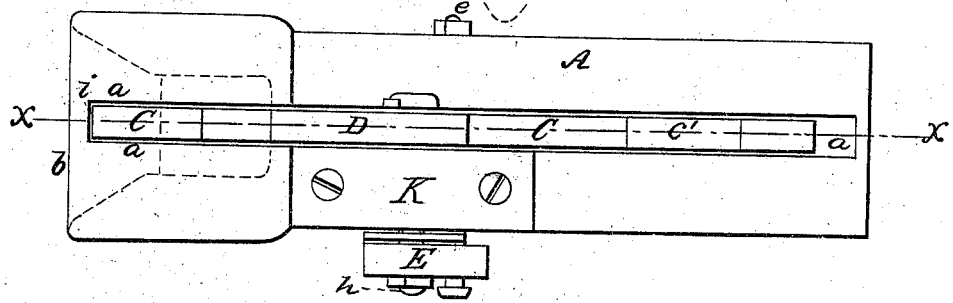
Figure 2 is a bottom view of the improved device.

The forward end or arm of this latch-bar C has a hook, c, formed on it, which extends upward and backward, so as to receive behind it, and retain a link, J, as indicated in fig. 1.

Figure 3:
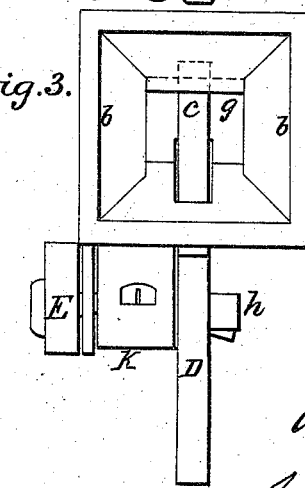
Figure 3 is an end view of the same.

The front edge of this hook c is bevelled backward, and the upper end of this hook has provided for it, in the upper wall of the box b, a recess, which affords a supporting-shoulder for the hook when in the position indicated in black lines, figs. 1 and 3.

That part of the latch-bar C which extends back of the bolt or fulcrum-pin e, is enlarged and loaded, so as to counterbalance the weight of the front hooked portion, and operate to keep this portion up to its place.

When the latch-bar C is free, so that its hooked end will assume the position shown in fig. 1 in black lines, it will operate as a self-coupling, and by simply inserting one end of a link, J, into the box b, and pressing this link backward, as shown in fig. 1, it will be caught and held in place by the hook c.

In the act of entering the link into its box b, the latch-lever will first assume the position indicated in red lines; then, when the link has passed over the upper end of the hook c, this hook will be thrust up through the link by the weight of the arm c'

In this position of the latch-lever, its front end will be supported against forward thrust by the shoulders at s t, formed on the coupling-box.

Beneath the fulcrum-pin e of the latch-lever, is a cam, D, which is keyed on a transverse rocking pin, h, having its bearing in a box, K, and having secured, on one end of it, an arm, E.

This cam is so shaped and arranged, that by turning it backward and upward, it will act upon the loaded arm of the latch-lever and bar C, and, by raising it, depress the hooked end, as shown in red lines, fig. 1. This will lock hook c down, so as to release link J, or prevent this link from being caught by the hook.

When cam D is moved forward and upward, it will act upon the hooked arm of the latch-lever or bar, and lock this arm in the position indicated in black lines, fig. 1, thus preventing removal of the link J.

This cam D may be worked from the platform of a car, or from the top of a car, by the employment of a rod, or rod, chain, and pulleys, leading to the required point, and suitably connected to the free end of the arm E, or to lever C.

It will be seen, from the above description, that I have a self-coupling, which is provided with a locking-device, for effecting an uncoupling, when desired, or for locking the coupling-hook either open or shut; also that I fit the front end of the latching-lever or bar C into the coupling-box, in such manner as to afford it two front bearings or shoulders for supporting and strengthening this bar and its hook.

Having described my invention,

What I claim as new, and desire to secure by Letters Patent, is—

The combination and arrangement of the draw-head A, gravitating-hook C, and pivoted device D, substantially as described.

ALBERT BRANSHAW.

Witnesses:
GEO. P. KNOWLES,
C. BRANSHAW.